US007227960B2

(12) United States Patent
Kataoka (10) Patent No.: US 7,227,960 B2
(45) Date of Patent: Jun. 5, 2007

(54) ROBOT AND CONTROLLING METHOD OF THE SAME

(75) Inventor: Toshihiko Kataoka, Zama (JP)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 10/150,121

(22) Filed: May 16, 2002

(65) Prior Publication Data

US 2002/0181723 A1 Dec. 5, 2002

(30) Foreign Application Priority Data

May 28, 2001 (JP) ............................. 2001-158152

(51) Int. Cl.
  *H04R 3/00* (2006.01)
  *G06F 10/00* (2006.01)
  *G05B 19/04* (2006.01)
(52) U.S. Cl. .................... 381/92; 700/245; 700/246
(58) Field of Classification Search ............... 700/246, 700/245; 901/46, 50; 381/92; 348/211.99, 348/231.3
See application file for complete search history.

(56) References Cited

U.S. PATENT DOCUMENTS 5,590,241 A * 12/1996 Park et al. .................. 704/227
5,602,962 A *  2/1997 Kellermann ................ 704/226
5,778,082 A *  7/1998 Chu et al. ................... 381/92
5,912,966 A *  6/1999 Ho .......................... 379/406.05
6,347,261 B1 *  2/2002 Sakaue et al. .............. 700/245
6,785,394 B1 *  8/2004 Olsen et al. ................. 381/312
2001/0028719 A1 * 10/2001 Hayashi ....................... 381/92

FOREIGN PATENT DOCUMENTS

JP     05-215568      3/1993
JP     11-018193      1/1999
JP     2000-187498    7/2000

OTHER PUBLICATIONS

Ohga, et al., "Sound System and Digital Processing", The Inst. of Elect., Info. & Comm. Eng., pp. 197-209, (Mar. 25, 1995).

* cited by examiner

*Primary Examiner*—Vivian Chin
*Assistant Examiner*—Douglas Suthers
(74) *Attorney, Agent, or Firm*—Akerman Senterfitt (57) ABSTRACT

An attention direction of a robot, indicated by a face, eyes or the like thereof, can be aligned with a directivity direction of a microphone array. Specifically, an acoustic signal from a sound source can be captured, and input signals for individual microphones can be generated. A direction of the sound source can be estimated from the input signals. A visual line of the robot, a posture thereof, or both, can be controlled such that the attention direction of the robot coincides with the direction of the sound source. Then, the directivity direction of the microphone array can be aligned with the attention direction. Thereafter, voice recognition can be performed with an input of a delay sum corresponding to the directivity direction.

6 Claims, 5 Drawing Sheets

ROBOT AND CONTROLLING METHOD OF THE SAME

CROSS REFERENCE TO RELATED APPLICATIONS

This application claims the benefit of Japanese Application No. 2001-158152, filed May 28, 2001.

BACKGROUND OF THE INVENTION

1. Technical Field

The present invention relates to a humanoid robot and a method of controlling the same. More particularly, the present invention relates to a technology applicable to, and effective in, realization of natural motion of the robot and enhancement of voice recognition accuracy therein.

2. Description of the Related Art

Humanoid robots have been developed in recent years and they are causing a stir. A humanoid robot is quite different from application-specific or function-specific robots, such as assembly robots or welding robots, used mainly in production lines or the like. The humanoid robot has a head, a body, and limbs modeled after a human being. The humanoid robot also includes sensors corresponding to acoustic, optical, and tactile senses. An attempt also has been made to allow the humanoid robot to perform voice recognition using an acoustic sensor corresponding to the acoustic sense.

With regard to humanoid robots and performance of speech recognition, the robot is expected to be able to recognize voices given thereto from an arbitrary direction. To perform voice recognition, voice capture with microphones is required. Omnidirectional microphones are not preferable therein since the omnidirectional microphones capture noise and un-targeted sounds. Therefore, it is desirable that a direction of a sound source be estimated by use of a microphone array, for example, whereby means for discretionarily varying directivity through the use of beam forming can be adopted. Through beam forming, a gain of a sound from a targeted direction can be increased. For example, a S/N ratio can be enhanced.

Figure 9:
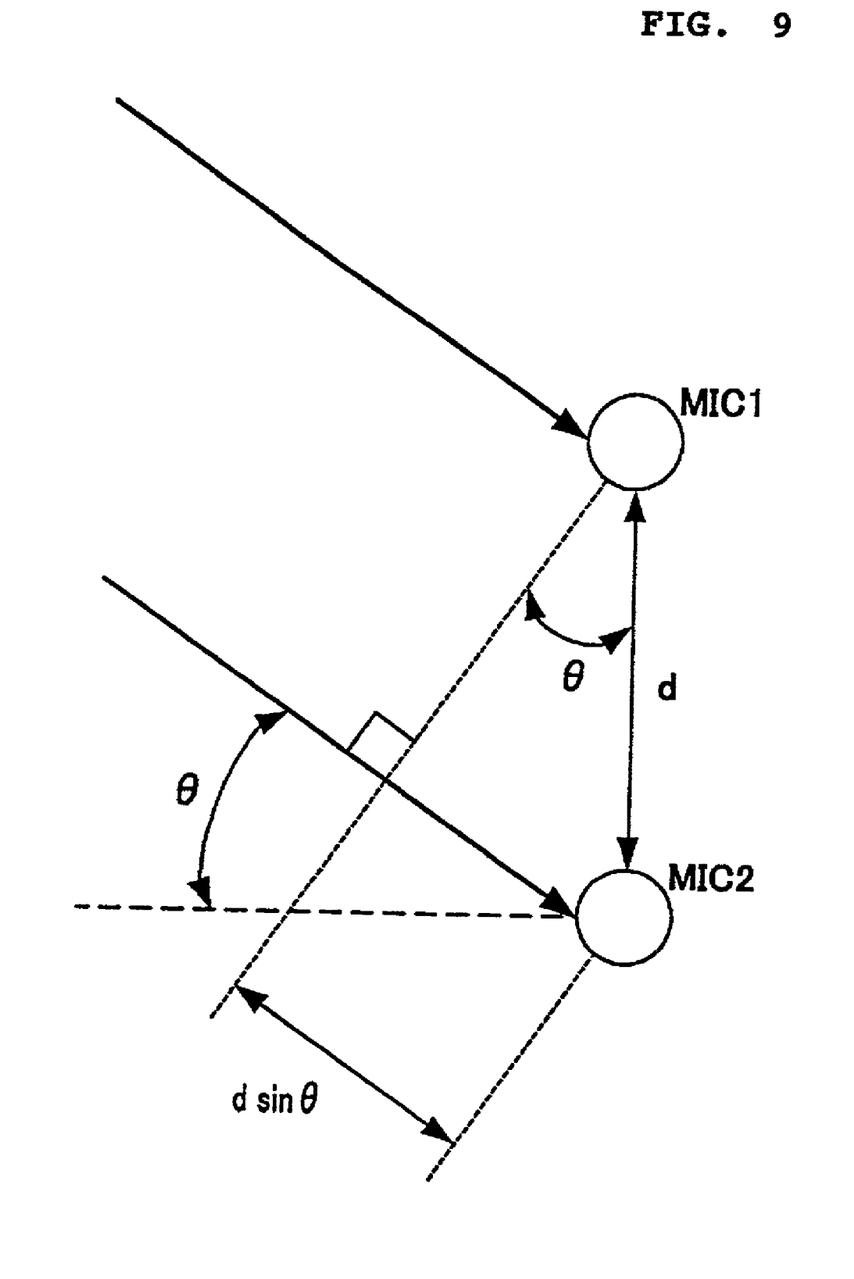
FIG. 9 is a view illustrating prior art.

In general, a time difference (a phase difference) in signals captured by a plurality of microphones can be utilized for the directional estimation of a sound source with the microphones array. Specifically, as shown in FIG. 9, an assumption is made that an acoustic wave is made incident at an angle θ with respect to normals of the microphone array composed of a microphone 1 (MIC 1) and a microphone 2 (MIC 2). Now, assuming that a distance from the sound source is sufficiently large with respect to a space "d" between the microphone 1 and the microphone 2, then an incident acoustic wave can be presumed to be a plane wave. Accordingly, when an acoustic signal captured with the microphone 1 is x1(t), an acoustic signal x2(t) to be captured with the microphone 2 is defined as:

$$x2(t) = x1(t - \tau s) \quad \text{(Formula 1)}$$

Here, τs is a time difference between x1(t) and x2(t). When the acoustic velocity is denoted as c, then it is obvious from the drawing that:

$$\tau s = (d \times \sin\theta)/c \quad \text{(Formula 2)}$$

Therefore, the direction θ of the sound source can be found by measuring the time difference τs, as defined by the following formula of:

$$\theta = \sin^{-1}(c \times \tau s/d) \quad \text{(Formula 3)}$$

The time difference τs can be found out from a cross-correlation function of a plurality of captured signals or a maximum value of power of a delay sum thereof. In the case of using the cross-correlation function, for example, a cross-correlation function $\phi 12(\tau)$ of x1(t) and x2(t) is defined as:

$$\phi 12(T) = E[x1(t) \cdot x2(t+T)] \quad \text{(Formula 4)}$$
$$= E[x1(t) \cdot x1(t+T-TS)]$$
$$= \phi 11(T-TS)$$

In other words, $\phi 12(\tau)$ is an autocorrelation function of x1(t), which is expressed as $\phi 11(\tau - \tau s)$. Note that E[·] herein denotes an expected value.

Since the autocorrelation function $\phi 11(\tau)$ takes the maximum value at τ=0, the above-mentioned formula takes the maximum at τ=τs. Accordingly, τs can be obtained by calculating $\phi 12(\tau)$ from x1(t) and x2(t) and finding τ that gives the maximum value of $\phi 12(\tau)$.

As described above, it is possible to estimate the direction of the sound source by use of the microphone array. Moreover, beam forming is feasible by calculating the delay sum of the signals corresponding to the direction of the sound source and by using the power of the delay sum as a signal.

The beam forming can be performed by calculation in a high speed digital signal processor (DSP); therefore, the directivity can be varied rapidly in comparison with motion of a robot. Moreover, a directional beam needs to have proper hysteresis so as not to sensitively respond to sporadic sounds. However, as a direction of the directional beam is invisible, a speaker cannot recognize a directivity direction (the direction of voices to be recognized by the robot) of the robot. As a result, there are situations in which the robot recognizes voices from unexpected directions, or where the robot does not sufficiently recognize voices from the direction that the speaker expects (generally the direction along a visual line of the robot). Such aspects may cause discomfort to the speaker, who is expecting natural motion of the robot.

Moreover, accuracy of the above-described directional estimation of the sound source is restricted by a frequency bandwidth of the signal. In short, in the above-described mode, the time difference τs is found by detecting a peak value of the cross-correlation function. However, a peak of $\phi 12$ becomes gentle if bandwidths of the signals x1 and x2 are narrow, and the peak of $\phi 12$ becomes sharp if the bandwidths are wide. Since the more detection accuracy is improved, the sharper the peak obtainable becomes, the accuracy of the directional estimation of the sound source may be resultantly differentiated by the signal bandwidths.

Although an increase in the number of the microphones or widening of the space "d" between the microphones may conceivably enhance the accuracy for the direction θ of the sound source, such a mode may incur an increase in a physical scale of the microphone array. Such increased size can be unsuitable for a small system.

SUMMARY OF THE INVENTION

An object of the present invention is to provide means for controlling a robot to move naturally upon its motion in voice recognition. Moreover, another object of the present invention is to provide a technology for enhancing accuracy in directional estimation of a targeted voice and eventually enhancing voice recognition accuracy of a robot, without increasing a physical scale of a microphone array equipped therewith.

A summary of the invention of the present application is provided below. A method of controlling a robot according to the present invention can include the step of aligning an attention direction of a robot with a directivity direction of voice capturing means thereof. The directivity direction refers to a direction in which the voice capturing means such as a microphone has a high voice sensitivity. Thus, a speaker can recognize that the attention direction of the robot is the directivity direction of voice capturing, whereby motion of the robot seems natural. In other words, the robot captures voices by the motion possibly expected by the speaker.

According to one aspect of the invention, the voice capturing means can be a microphone array including a plurality of microphones. The controlling method can include the steps of: generating input signals severally for the microphones by capturing an acoustic signal from a sound source, estimating a direction of the sound source from the input signals, controlling any one or both of a visual line and a posture of the robot to allow an attention direction of the robot to coincide with the direction of the sound source, and aligning a directivity direction of the microphone array with the attention direction.

The controlling method further can include the steps of: selecting a first input signal and a second input signal out of the input signals and correcting a phase of the second input signal by a delay amount corresponding to the directivity direction with respect to the first input signal. The method also can include calculating a sum signal of the first input signal and the second input signal, calculating power of the sum signal, and performing voice recognition by use of the power. In this way, recognition accuracy of voices from the directivity direction can be enhanced.

The robot further can include an omnidirectional microphone. The controlling method can include the steps of: performing a first judgment whether an acoustic input to the omnidirectional microphone exceeds a predetermined duration and a predetermined level and iterating the steps of generating input signals, estimating the direction of the sound source, moving the attention direction and aligning the attention direction with the directivity direction in a case where a judged result of the first judgment is true. The method also can include performing a second judgment whether the acoustic input to the microphones constituting the microphone array continues within a predetermined duration and within a predetermined level, and shifting to a standby mode for acoustic inputs with the omnidirectional microphone in a case where a judged result of the second judgment is true. Accordingly, a state capable of capturing sounds from an arbitrary direction is maintained during a silent mode. The capturing sensitivity for a certain direction can be enhanced upon paying attention to a sound source in that direction.

The step of estimating the direction of the sound source can include the steps of: obtaining error signals by processing the input signals by use of an adaptive filter, calculating a cross-correlation function among a plurality of the error signals, and finding a peak value of the cross-correlation function along an axis of duration. Thus, the peak value of the cross-correlation function can be accurately found by using the error signals containing more high-frequency components than the input signals. The accuracy of directional estimation of the sound source thereby can be enhanced.

In addition, the foregoing invention also can be embodied as a robot.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE INVENTION

Now, embodiments of the present invention will be described in detail with reference to the accompanying drawings. It should be noted, however, that the present invention can be embodied in various other modes. Therefore, the present invention shall not be understood to be limited to the description of the embodiments disclosed herein. It also should be noted that identical constituent components are denoted by identical numbers throughout the embodiments described herein.

Figure 1:
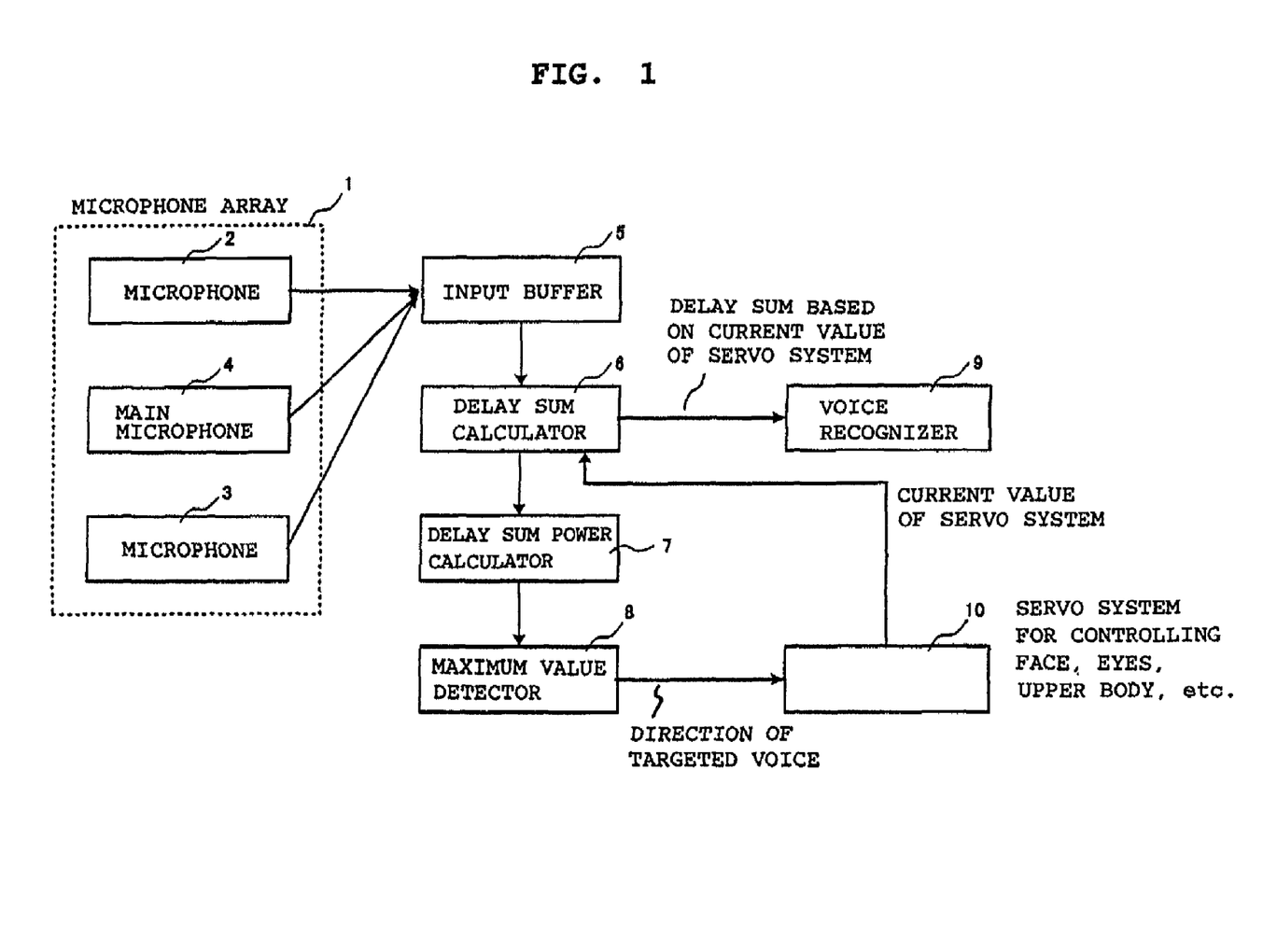
FIG. 1 is a block diagram showing functions of one example of a robot according to one embodiment of the present invention.

FIG. 1 is a block diagram showing functions of one example of a robot according to one embodiment of the present invention. The robot of this embodiment can include a microphone array 1. The microphone array 1 can include microphones 2 and 3, and a main microphone 4. Moreover, the robot can include an input buffer 5, a delay sum calculator 6, a delay sum power calculator 7, a maximum value detector 8, a voice recognizer 9, and a servo system 10.

The robot of this embodiment can be, for example, a humanoid robot. The robot can include a head, a body, hands, and legs, and can walk on two legs similar to a human being. The body and the head can be movable, for example, having the ability to rotate within their movable ranges, whereby posture control toward a direction of a sound source is feasible as described later. Not being limited to the inventive arrangements disclosed herein, the robot can include an optical function and can have a structure to change an eye direction thereof. Still, the present invention is not limited to the humanoid robot. Rather, the robot may take a form of an animal such as a mouse, a dog, a cat, or the like, or may take an original form that is nonexistent on earth. After all, it is satisfactory so far as the robot has capability of the posture control, head motion or eye direction shifts toward the direction of the sound source. Such posture control, motion of the body and the head, or eye direction shifts can be controlled by a well-known technology such as servo control.

The microphones 2 and 3 that constitute the microphone array 1 can be publicly-known microphones that convert acoustic signals into electric signals. Nevertheless, as signal processing is conducted with digital signals in this embodiment, the microphones can include publicly-known sampling and quantization means. In the case of a humanoid robot, for example, the microphones 2 and 3 can be fitted to both shoulders of the body, both sides of the waist, or both ears on the head. The main microphone 4 can be an omnidirectional microphone and can be fitted to an arbitrary position of the robot. As described later, the main microphone 4 can be used for controlling the robot in a silent mode.

The input buffer 5 is a storage area which can temporarily record input data from each of the microphones. The delay sum calculator 6 can calculate a delay sum of input signals from the microphones 2 and 3. A current value can be inputted by the servo system 10 as a delay amount to the delay sum calculator 6. Moreover, a delay sum value based on the current value of the servo system can be inputted to the voice recognizer 9. The voice recognizer 9 performs voice recognition by use of the foregoing delay sum data. The delay sum power calculator 7 can calculate power of the delay sum of the input signals from the microphones. A maximum value of this delay sum power then can be detected by the maximum value detector 8, whereby a direction of a targeted voice can be computed based on time $\tau s$ indicating the maximum value. The direction of the targeted voice then can be inputted to the servo system 10, whereby a face, eyes, an upper body, or the like of the robot can be controlled accordingly.

Figure 2:
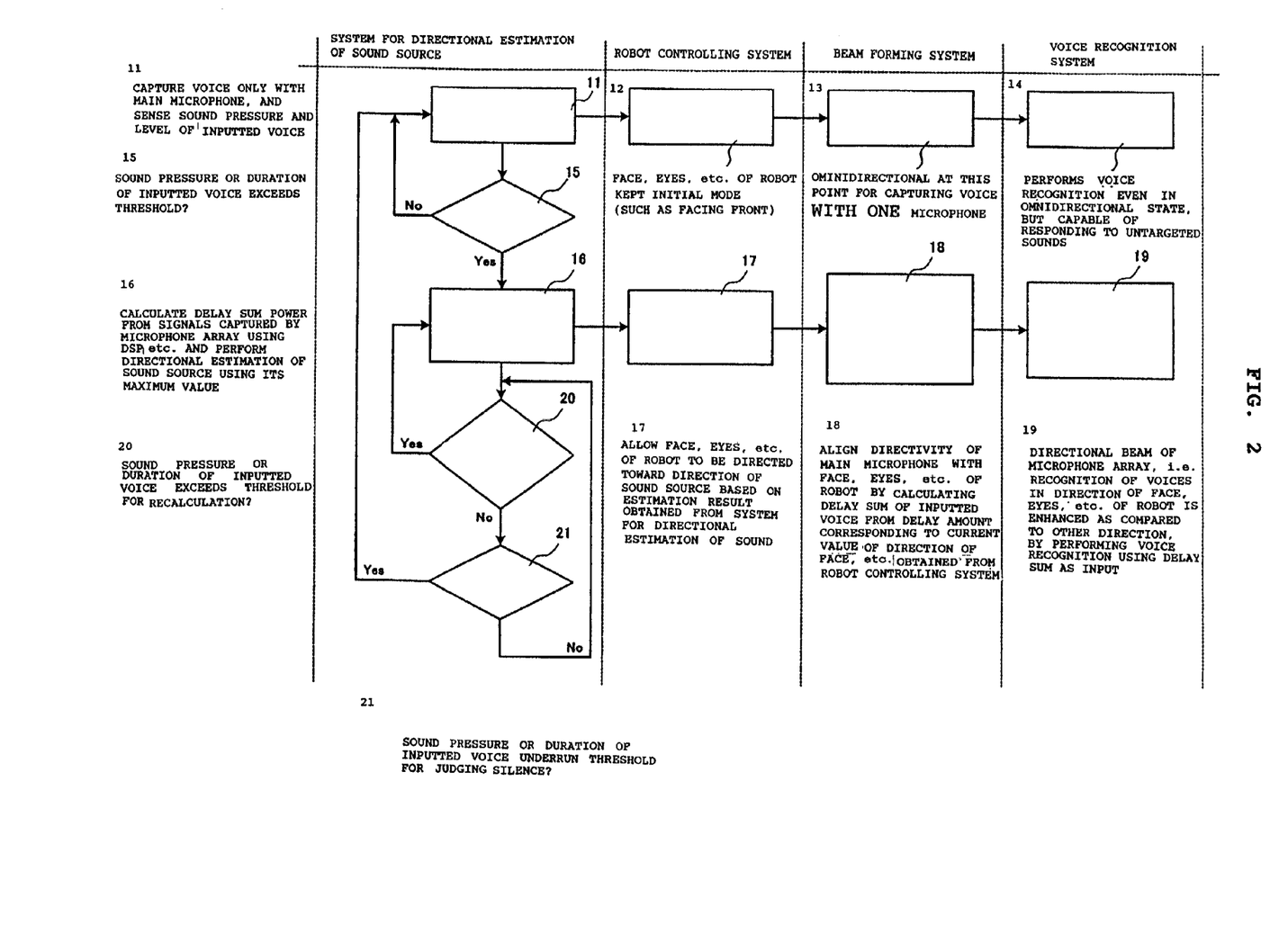
FIG. 2 is a flowchart showing one example of a method of controlling a robot according to one embodiment of the present invention.

FIG. 2 is a flowchart showing one example of a method of controlling a robot in accordance with the inventive arrangements disclosed herein. In an initial mode or in a silent mode of the robot, a system for directional estimation of a sound source can capture a voice only with the main microphone 4 and detect sound pressure level of the voice inputted (Step 11). Accordingly, a robot controlling system can set up the face, the eyes, and the like of the robot to the initial mode, such as facing the front (Step 12). Notably, a beam forming system does not perform beam forming (formation of directivity) in particular (Step 13). In other words, since the robot captures the voice only with the main microphone 4, the robot can omni-directionally capture acoustic signals. Moreover, a voice recognition system can perform voice recognition based on the signals captured by the main microphone 4 (Step 14). Nevertheless, there is a possibility that the voice recognition system will respond to un-targeted voices because the voice recognition system recognizes voices omni-directionally.

The system for directional estimation of a sound source can judge whether the inputted voice sensed by the main microphone 4 in Step 11 exceeds predetermined thresholds of sound pressure and duration (Step 15). The thresholds can be selected by experiments or the like, based on a sound pressure level high enough not to be deemed as silence. Otherwise, by use of an autogain control function, the thresholds can be dynamically controlled so as to respond to voice signals larger than environmental noise. In addition, the voice recognition system can be adjusted not to respond to brief sounds such as sporadic sounds. Thus, the thresholds of the sound pressure level and the duration can be set so that the voice recognition system surely responds to a voice call from a certain direction or the like.

When the judgment of step 15 is "NO" (when judged as silence), then the controlling method can return to Step 11 and remain in a voice-sensing state with the main microphone 4. Needless to say, the robot controlling system, the beam forming system, and the voice recognition system also maintain the above-described initial mode in this case.

When the judgment is "YES" in Step 15 (where a judgement that a voice from a certain direction is present), the system for directional estimation of a sound source can proceed to Step 16 for processing signals captured by the microphones 2 and 3 of the microphone array 1. Estimation of the direction of the sound source can be conducted by this processing. The estimation of the direction of the sound source can be conducted, for example, by means of processing the input signals with the DSP or the like, and by calculating power of a delay sum of the signals. The direction $\theta$ of the sound source can be calculated from time $\tau s$ indicating the maximum value of the delay sum power as previously described.

Using $\theta$ thus calculated, the robot controlling system can control the face, the eyes, the upper body, or the like of the robot to face the direction of the sound source (Step 17). Simultaneously, by use of an output of the controlling system, for example a servo output, the delay amount corresponding to the current value (equivalent to the attention direction of the robot) can be calculated, and then a delay sum of the inputted voices can be calculated by use of the delay amount (Step 18). In this manner, the directivity direction of the microphone array 1 can be aligned with the direction of the face or the eyes of the robot. What should be emphasized here is that the directivity direction of the microphone array 1 need not be immediately aimed at the direction of the targeted voice (the sound source), but the directivity thereof need only be aligned with the current value of the robot controlling system. In other words, the directivity direction (the beam forming) of the voice input can be coincided with the attention direction of the robot. Accordingly, a speaker speaking to the robot can visually recognize a direction from which the robot currently intends to recognize a voice. In addition, since the robot performs the voice recognition by enhancing voices from the direction in which the robot is currently seeing, such motion of the robot seems natural to the speaker.

The delay sum calculated in Step 18 then can be transmitted to the voice recognition system, which performs voice recognition using the delay sum (Step 19). As the voice recognition system performs the voice recognition by use of the delay sum, a recognition rate of the voice can be increased in the directivity direction of the microphone array 1, that is, the attention direction of the robot, as compared to other directions.

The system for directional estimation of a sound source then can judge whether the sound pressure and the duration of the inputted voice thereafter exceed the thresholds for recalculation of the directional estimation (Step 20). Then, the controlling method can return to Step 16 and iterate the above-described processing when the judgment is "YES". When the judgment is "NO", then the controlling method can proceed to Step 21.

In Step 21, the controlling method can judge whether the sound pressure and the duration of the inputted voice exceeds the thresholds for judging silence (Step 21). In the case of a "YES" judgement (judged as silent), then the controlling method can return to Step 11 to iterate the above-described processing. In the case of a "NO" judgement, then the controlling method can return to Step 20 and iterate the above-described processing.

According to this embodiment, since the attention direction of the robot is aligned with an incident direction of the voice targeted for the voice recognition, the direction that the robot intends to recognize voices from becomes visually discernible to the speaker. Accordingly, the speaker does not feel discomfort from the motion of the robot, and the natural motion of the robot is realized. In addition, in a state where the robot is performing beam forming, voices from the attention direction thereof (the directivity direction of the microphone array) are emphasized, whereby the recognition rate of the voices from that direction can be enhanced.

With regard to one embodiment of the invention, description has been made regarding the example of using the power of the delay sum of the signals for the directional estimation of the sound source. Nevertheless, as similar to the above-described case of using the correlation function of the signals, the case of using the power of the delay sum is also restricted by the frequency band of the signals and accuracy of directional estimation thereof (accuracy of detecting the maximum value) is low. In the following embodiment, description will be made regarding another mode capable of enhancing the accuracy of the directional estimation.

Figure 3:
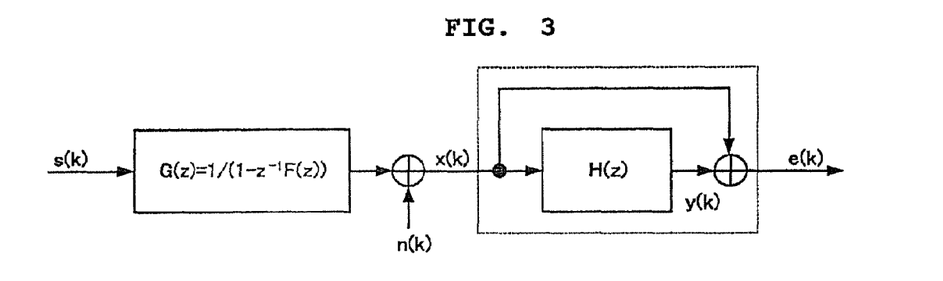
FIG. 3 is a view showing one example of an acoustic model of a signal processing system that can be used with the present invention.

FIG. 3 is a view showing one example of an acoustic model of a signal processing system which can be used with one embodiment of the present invention. An input $s(k)$ is a vibration source such as pulses of a vocal-cord source. $G(z)$ shows a transfer characteristic of a vocal tract or a transfer characteristic of an environment of a room or the like. A voice denoted by $x(k)$ is a sound that reaches a microphone, which is obtained after $s(k)$ passed through $G(z)$. Now, consideration will be made regarding a case of obtaining an error signal $e(k)$ after the voice $x(k)$ is passed through a filter expressed as $P(z)=1-z^{-1}H(z)$.

When $G(z)$ is expressed as $G(z)=1/(1-z^{-1}F(z))$ and $H(z)=F(z)$, then $P(z)$ is a reverse filter of $G(z)$ and $e(k)$ becomes $s(k)$. The signal $e(k)$, i.e. $s(k)$ corresponds to a pulse generated by a vocal cord and contains more high-frequency components in comparison with the signal $x(k)$ captured by the microphone. Accordingly, obtainment of a cross-correlation function with a sharp peak can be expected. Note that noise $n(k)$ is disregarded herein for the purpose of simplification.

For example, an adaptive filter is applicable to $H(z)$. The adaptive filter is a predictive filter adopted for the purpose of realizing optimum control in a system where a transfer function is not predeterminable or in a time-variable system. Parameters of the filter are calculated by an adaptive algorithm in each step so as to converge on an optimum value and are dynamically varied.

Figure 4:
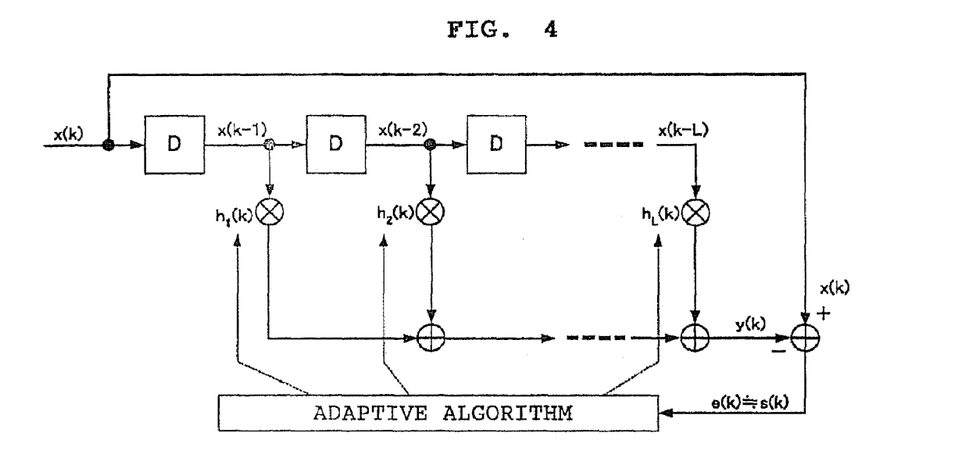
FIG. 4 is a view showing one example of an adaptive filter that can be used with the present invention.

FIG. 4 is a view showing one example of an adaptive filter which can be used with the present invention. The signal $x(k)$ captured by the microphone passes through delay circuits (D) composed of L stages, and a sum of products of delay data $x(k-i)$ and parameters $h_i(k)$, expressed as SUM $(h_i(k)x(k-i))$, becomes a predicted value $y(k)$. Here, $i=1$ to $L$ and $SUM(a_i)$ is a direct sum set concerning $a_i$. Therefore;

$$y(k)=h_1(k)x(k-1)+h_2(k)x(k-2)+\ldots+h_L(k)x(k-L) \quad \text{(Formula 5)}$$

$$e(k)=x(k)-y(k) \quad \text{(Formula 6)}$$

$$h_i(k+1)=h_i(k)+\mu e(k)x(k-i) \quad i=1,2,\ldots,L \quad \text{(Formula 7)}$$

Here, $\mu$ is a step size.

When $h_i(k)$ converges on the optimum value by the adaptive algorithm expressed as the above-described Formula 7 (the least squares method is exemplified herein), $y(k)$ becomes a predicted value of $x(k)$ and a squared average of the error signal $e(k)$ becomes the minimum. In this case, the error signal $e(k)$ can be deemed as an unpredicted vibration source pulse $s(k)$. Naturally, as being a pulse, the vibration source pulse contains more high-frequency components than a microphone signal $x(k)$. Calculation of the cross-correlation function using error signals of the individual microphones renders the peak thereof sharp.

It should be noted that the adaptive algorithm is provided for constituting a forward predictive filter; accordingly, other algorithms such as the learning identification method can be used instead of the least squares method.

Figure 5:
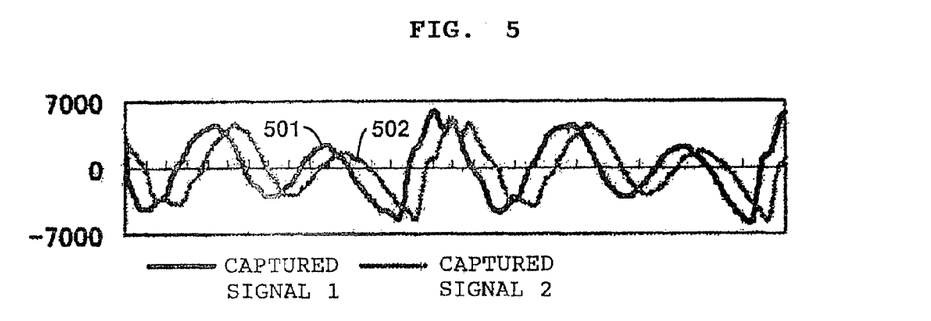
FIG. 5 is voice waveform data for simulation that shows waveforms of signals captured by microphones.
Figure 6:
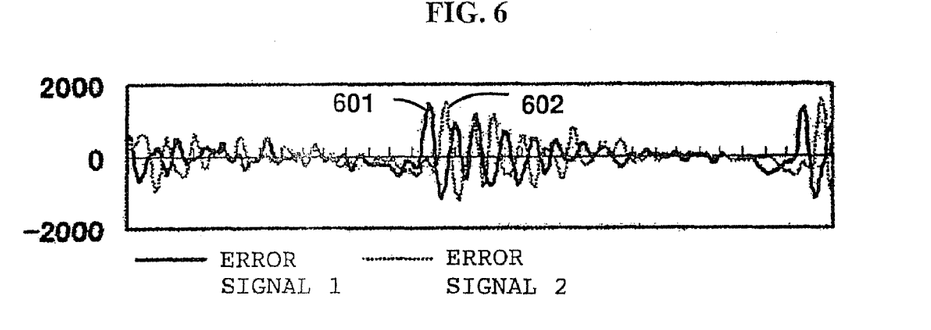
FIG. 6 is a view showing waveforms of error signals obtained from the captured signals of FIG. 5 by use of the adaptive filter.

FIG. 5 is voice waveform data for simulation, which shows waveforms 500 of the signals captured by the microphones. The signal captured by the microphone 1 is referred to as a captured signal 1 501, and the signal captured by the microphone 2 is referred to as a captured signal 2 502. A space between the microphones is set to 20 cm; a direction of the sound source (0) is set to 30 degrees; and a sampling frequency is set to 44.1 kHz, respectively. FIG. 6 is a view showing waveforms of the error signals 600 obtained from the captured signals of FIG. 5 by use of the above-described adaptive filter. The error signal of the captured signal I is referred to as an error signal 1 601, and the error signal of the captured signal 2 is referred to as an error signal 2 602. Conditions of I/O simulation are the same as those for the case in FIG. 5. It is obvious from FIG. 6 that the error signals 601, 602 contain more high-frequency components than the captured signals 501, 502.

Figure 7:
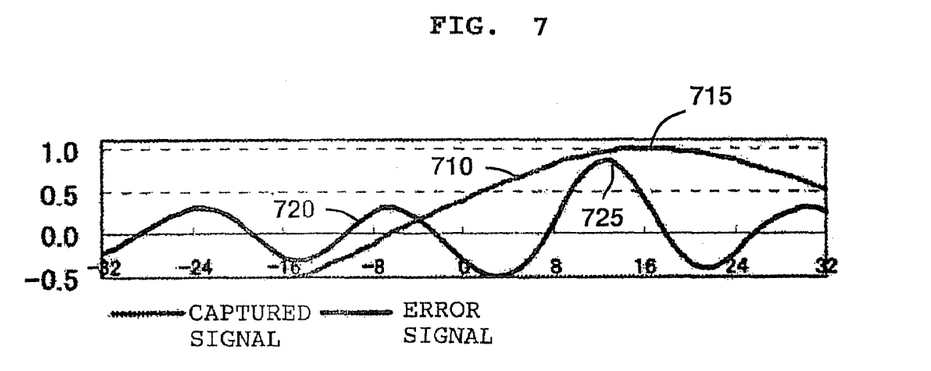
FIG. 7 is a graph showing a cross-correlation function between the captured signal 1 and the captured signal 2, and a cross-correlation function between the error signal 1 and the error signal 2.

FIG. 7 is a graph showing a cross-correlation function 710 between the captured signal 2 601 and the captured signal 2 602 (denoted by "captured signal"), and a cross-correlation function 720 between the error signal 1 601 and the error signal 2 602 (denoted by "error signal"). 512 samples (12 ms) of the same intervals are used for the captured signals 1 501 and 2 502, and the number of stages (L) of the adaptive filters is set to 20. In FIG. 7, the transverse axis indicates the number of samples (time).

It is obvious from FIG. 7 that the peak 725 of the cross-correlation function 720 of the error signals 601, 602 becomes sharp. The peak value 725 of the cross-correlation function 720 of the error signals 601, 602 exists in a position of the sample No. 13 (whereby the direction of the sound source is computed as 30.1 degrees), which is almost the theoretical value. On the other hand, the peak value 715 of the cross-correlation function 710 of the captured signals 501, 502 exists in a position of the sample No. 16 (the direction of the sound source is equivalent to 38.1 degrees), which causes an error of about 8 degrees. As described above, this embodiment effectuates accurate estimation of the direction of the sound source.

Figure 8:
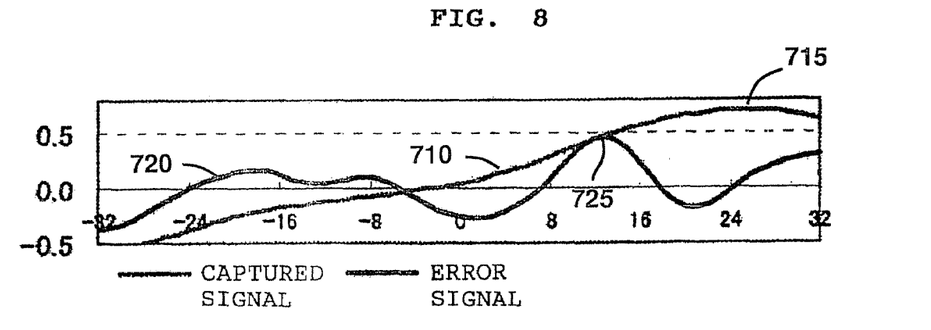
FIG. 8 is a view showing a cross-correlation function in the case where noise is added to a targeted voice.

FIG. 8 is a view showing the cross-correlation functions 712, 720 in the case where noise having a S/N ratio of 4.2 dB is added from a direction of 0=−40 degrees to the targeted voice (0=30 degrees). In this case, the peak value 715 of the cross-correlation function 710 of the captured signals 501, 502 exists in a position (the sample No. 25 (equivalent to 0 74.5 degrees)) indicating a different direction from that of the targeted voice as well as the noise. In the meantime, the peak value 725 of the cross-correlation function 720 of the error signals 601, 602 exists in the position of the sample No. 13, which indicates a more accurate direction than that for the captured signals 501, 502. It is conceivable that the above-mentioned fact is brought about because the noise is also predicted to some extent by the adaptive filter and a vibration source of the noise is approximated by the error signal. The above can be deemed as an example of significantly showing the advantage of this embodiment.

The invention achieved by the inventor of the present application has been described in detail with reference to the above embodiments of the present invention. However, it should be understood that the present invention is not limited to the above-described embodiments, but various changes and modifications can be made therein without departing from the scope of the invention.

For example, description was made with regard to one embodiment of the present invention regarding the identification of the direction of the sound source in a horizontal plane, as well as the control of beam forming and of the attention direction of the robot. If the microphone array is arranged vertically, however, a similar control also can be also in a vertical plane.

Description also was made regarding the standby mode for voice capturing in the silent state or the initial state through the use of the main microphone 4. Any one of the microphones 2 and 3, however, may be substituted for the main microphone 4.

Moreover, description was made regarding a least-mean-square algorithm (LMS) as the adaptive algorithm for the adaptive filter. Other algorithms, however, such as a steepest-descent algorithm and a recursive least square (RLS) algorithm also may be utilized therein. Furthermore, the algorithm is not limited by the forward prediction, but a backward prediction is also applicable.

The invention disclosed herein can provide several advantageous effects. For example, natural motion of a robot upon voice recognition can be achieved. Accuracy of directional estimation of a targeted voice can be enhanced without increasing a physical scale of a microphone array, thus enhancing voice recognition accuracy.

Although the preferred embodiments of the present invention have been described in detail, it should be understood that various changes, substitutions and alterations can be made therein without departing from spirit and scope of the inventions as defined by the appended claims.

What is claimed is:

1. A method of controlling a robot including voice capturing means having directivity based on frequency components of vocal cord pulses, the method comprising the steps of:
   aligning an attention direction of the robot with a directivity direction of a microphone array including a plurality of microphones;
   generating input signals severally for the microphones by capturing an acoustic signal from a sound source;
   passing each input signal through an adaptive filter for generating an excitation signal for each input signal, wherein each adaptive filter generates an inverse filter that models a vocal tract envelope and generates an excitation signal that models vocal cord pulses, wherein the excitation signal contains more high-frequency components in comparison to the corresponding input signal captured at the microphone;
   estimating a direction of the sound source from a plurality of excitation signals based on frequency components of vocal cord pulses by:
      calculating a cross-correlation function among the plurality of excitation signals to produce a sharp peak based on frequency components of the vocal cord pulses, and
      finding a peak value of the cross-correlation function along an axis of duration, wherein the location of the peak identifies the direction corresponding to the vocal cord pulses,
   controlling at least any one of a visual line and a posture of the robot based on said direction to allow the attention direction of the robot to coincide with the direction of the sound source; and
   aligning the directivity direction of the microphone array with the attention direction such that the robot is aligned in a direction of the sound source corresponding to the frequency components of vocal cord pulses.

2. The method of controlling a robot according to claim 1, wherein said estimating a direction of the sound source further comprises the steps of:
   selecting a first input signal and a second input signal out of the input signals and correcting a phase of the second input signal by a delay amount corresponding to the directivity direction with respect to the first input signal;
   calculating a sum signal of the first input signal and the second input signal;
   calculating power of the sum signal; and
   performing voice identification by use of the power to align said attention direction of the robot to a recognized voice of a speaker.

3. The method of controlling a robot according to claim 1, wherein the robot further includes an omnidirectional microphone, and the method further comprises the steps of:
   performing a first judgment whether an acoustic input to the omnidirectional microphone exceeds a predetermined duration and a predetermined level;
   iterating the steps of generating the excitation signals, estimating the direction of the sound source, moving the attention direction, and aligning the attention direction with the directivity direction in a case where a judged result of the first judgment is true;
   performing a second judgment whether the acoustic input to the microphones constituting the microphone array continues within a predetermined duration and within a predetermined level; and
   shifting to a standby mode for acoustic inputs with the omnidirectional microphone in a case where a judged result of the second judgment is true.

4. A robot comprising:
   voice capturing means having directivity based on frequency components of vocal cord pulses; and
   means for aligning an attention direction of the robot with a directivity direction of a microphone array including a plurality of microphones;
   means for generating excitation signals severally for the microphones by capturing an acoustic signal from a sound source using an adaptive filter, that generates an inverse filter that models a vocal tract envelope and generates an excitation signal that models a vocal cord pulse, wherein the excitation signal contains more high-frequency components in comparison to the corresponding input signal captured at the microphone;
   means for estimating a direction of the sound source from the input signals based on frequency components in vocal cord pulses by:
      calculating a cross-correlation function among a plurality of the excitation signals to produce a sharp peak based on frequency components of the vocal cord pulses, and finding a peak value of the cross-correlation function along an axis of duration, wherein the location of the peak identifies the direction corresponding to the vocal cord pulses, means for controlling at least any one of a visual line and a posture of the robot based on said direction to allow the attention direction of the robot to coincide with the direction of the sound source; and means for aligning the directivity direction of the microphone array with the attention direction such that the robot is aligned in a direction of the sound source having frequency components of the vocal cord pulses.

5. The robot according to claim 4, further comprising:

means for selecting a first input signal and a second input signal out of the input signals and correcting a phase of the second input signal by a delay amount corresponding to the directivity direction with respect to the first input signal;

means for calculating a sum signal of the first input signal and the second input signal;

means for calculating power of the sum signal; and means for performing voice identification by use of the power.

6. The robot according to claim 4, further comprising:

an omnidirectional microphone:

first judgment means for judging whether an acoustic input to the omnidirectional microphone exceeds a predetermined duration and a predetermined level;

means for iterating steps of generating the input signals, estimating the direction of the sound source, moving the attention direction, and aligning the attention direction with the directivity direction in a case where a judged result of the first judgment means is true;

second judgment means for judging whether the acoustic input to the microphones constituting the microphone array continues within a predetermined duration and within a predetermined level; and means for shifting to a standby mode for acoustic inputs with the omnidirectional microphone in a case where a judged result of the second judgment means is true.

* * * * *